United States Patent
Marfatia et al.

(10) Patent No.: US 8,051,410 B2
(45) Date of Patent: Nov. 1, 2011

(54) APPARATUS FOR MIGRATION AND CONVERSION OF SOFTWARE CODE FROM ANY SOURCE PLATFORM TO ANY TARGET PLATFORM

(75) Inventors: Miten Marfatia, Sunnyvale, CA (US); Ajay M. Rambhia, Santa Clara, CA (US)

(73) Assignee: EvolveWare, Inc., Santa Clara, CA (US)

( * ) Notice: Subject to any disclaimer, the term of this patent is extended or adjusted under 35 U.S.C. 154(b) by 1016 days.

(21) Appl. No.: 10/582,839

(22) PCT Filed: Dec. 10, 2004

(86) PCT No.: PCT/IN2004/000385
§ 371 (c)(1),
(2), (4) Date: Mar. 23, 2007

(87) PCT Pub. No.: WO2005/069125
PCT Pub. Date: Jul. 28, 2005

(65) Prior Publication Data
US 2007/0256058 A1    Nov. 1, 2007

(30) Foreign Application Priority Data
Dec. 15, 2003   (IN) .......................... 885/MUM/2003

(51) Int. Cl.
*G06F 9/45*   (2006.01)
(52) U.S. Cl. ........ 717/137; 717/124; 717/125; 717/141; 717/147
(58) Field of Classification Search .................. None
See application file for complete search history.

(56) References Cited

U.S. PATENT DOCUMENTS

| | | | |
|---|---|---|---|
| 5,497,319 | A | 3/1996 | Chong et al. |
| 5,678,044 | A | 10/1997 | Pastilha et al. |
| 5,687,290 | A * | 11/1997 | Lewis .............................. 706/45 |
| 6,247,172 | B1 * | 6/2001 | Dunn et al. ................... 717/141 |
| 6,257,774 | B1 | 7/2001 | Stack |
| 6,330,553 | B1 * | 12/2001 | Uchikawa et al. ................ 706/2 |
| 6,370,646 | B1 * | 4/2002 | Goodman et al. ............ 713/100 |
| 6,523,172 | B1 * | 2/2003 | Martinez-Guerra et al. . 717/143 |
| 6,560,769 | B1 | 5/2003 | Moore et al. |
| 6,637,024 | B1 * | 10/2003 | Johnson et al. ............... 717/124 |
| 6,654,950 | B1 * | 11/2003 | Barnishan ..................... 717/136 |
| 6,668,370 | B1 * | 12/2003 | Harmon et al. ............... 717/125 |

(Continued)

OTHER PUBLICATIONS

"Assessing Process-Centered Software Engineering Environments", Vincenzo Ambriola et al., Jul. 1997, pp. 1-46, <http://delivery.acm.org/10.1145/260000/258080/p283-ambriola.pdf>.*

(Continued)

*Primary Examiner* — Thuy Dao
*Assistant Examiner* — Ziaul A. Chowdhury
(74) *Attorney, Agent, or Firm* — Fenwick & West LLP

(57) ABSTRACT

An apparatus migrates and/or converts any source application working on any platform into a format of any target platform. It comprises an inputting means for accepting the entire source code of sample part in ASCII to analyze the business logic of the source application and corresponding data; an analyzing means for analyzing the source schemes; a setting up means for generating (updating or creating) custom knowledge base; a processing means for conversion of source code in format of target specification; and A documenting means for generation of reports during review of the process stage and a summary report after the end of the conversion process, which consists of the code that is not converted automatically.

15 Claims, 2 Drawing Sheets

U.S. PATENT DOCUMENTS

| | | | | |
|---|---|---|---|---|
| 7,055,136 | B2* | 5/2006 | Dzoba et al. | 717/125 |
| 7,107,589 | B1* | 9/2006 | Tal et al. | 717/177 |
| 2002/0129126 | A1* | 9/2002 | Chu et al. | 709/220 |
| 2003/0009747 | A1* | 1/2003 | Duran | 717/137 |
| 2003/0217023 | A1 | 11/2003 | Cui et al. | |
| 2003/0220920 | A1* | 11/2003 | Lake et al. | 707/6 |
| 2003/0225927 | A1* | 12/2003 | Goodman et al. | 709/320 |
| 2003/0225935 | A1* | 12/2003 | Rivard et al. | 709/328 |
| 2003/0233631 | A1* | 12/2003 | Curry et al. | 717/100 |
| 2004/0158820 | A1* | 8/2004 | Moore et al. | 717/136 |
| 2005/0033741 | A1* | 2/2005 | Dombroski et al. | 707/3 |
| 2005/0038770 | A1 | 2/2005 | Kuchinsky et al. | |
| 2005/0125522 | A1* | 6/2005 | DelGaudio et al. | 709/223 |
| 2005/0160399 | A1* | 7/2005 | Kumar et al. | 717/104 |

OTHER PUBLICATIONS

"Towards Increasing Web Application Productivity", Jia Zhang et al., 2004, pp. 1-5, <http://delivery.acm.org/10.1145/970000/968233/p1677-zhang.pdf>.*

"Applying Test-First Programming and Iterative Development in Building an E-Business Application", Hubert Baumeister et al., 2002, pp. 1-6, <http://citeseerx.ist.psu.edu/viewdoc/download-?doi=10.1.1.19.4707&rep=rep1&type=pdf>.*

"A Rational approach to modeldriven development", A. W. Brown et al., 2006, pp. 1-18, <http://ieeexplore.ieee.org/stamp/stamp.jsp?tp=&arnumber=5386624>.*

Ferene, R., et al., "Extracting Facts with Columbus from C++ Code," In Tool Demonstrations of the $8^{th}$ European Conference on Software Maintenance and Reengineering, 2004, pp. 1-5.

Tjortjis, C., et al., "Facilitating Program Comprehension by Minding Association Rules from Source Code," Proceedings of the $11^{th}$ IEEE International Workshop on Program Comprehension, 2003, 8 Pages.

PCT International Search Report, PCT/IN2004/000385, Jul. 22, 2005, 2 pages.

PCT International Search Report and Written Opinion, PCT/US07/06249, Mar. 6, 2008, 12 Pages.

Australian First Office Action, Australian Application No. 2007348312, Mar. 17, 2011, 3 pages.

* cited by examiner

APPARATUS FOR MIGRATION AND CONVERSION OF SOFTWARE CODE FROM ANY SOURCE PLATFORM TO ANY TARGET PLATFORM

CROSS REFERENCE TO RELATED APPLICATIONS

This application is the National Stage of International Application No. PCT/IN2004/000385, filed Dec. 10, 2004, published in English under PCT Article 21(2), which is incorporated by reference in its entirety.

BACKGROUND

1. Field

The present invention generally relates to an apparatus for migration and conversion of software code using a knowledge engine (KE) to identify the source application and to convert the same logic and database to any target application using target specific knowledgebase (KB).

2. Description of the Related Art

Businesses of companies, governments and agencies evolve over the years. So do government regulations. Either or both of these scenarios result in changes, deletions or addition of rules that govern the mode of doing business. Today the useful information that contains the rules of doing business (business knowledge) is embedded in the source code of software applications and their documentation that run any organization's operations. Over the years, however, software application systems have grown beyond just the scope of maintaining system documentation and workings information. These systems have been modified, added to and deleted from as rules have changed; and the result is that they have become too rigid and hard to understand. To add to the problem, not only is the application knowledge distributed over disparate program code, but so are the data structures and data representation schemes this knowledge uses.

The problem with the various technologies available today is that they are limited in terms of their ability to discover, recognize and extract the required knowledge elements from diverse systems. The technologies are also non-flexible and produce proprietary outputs, which are not widely acceptable in the information technology (IT) world.

Another problem is adaptability. None of the available technologies are adaptable and "self learning" thereby limiting their repetitive and long-term applicability and use-ability. The prior solutions available had the following shortcomings: (1) They were unable to perform effectively transform the input data stream due to their limitations of using fixed 'static' rules; (2) They further do not ability to arrive at an abstract view for the input data stream, rather they use simple transformation and syntax matching techniques for interpreting input code on purely line-by-line basis and transforming the same; (3) The pattern recognition utilized in prior inventions or tools was not dynamic and hence not able to perform self-interpretation (i.e. interpretation on its own by dynamically looking at parameters); (4) The previous technologies did not provide ability to dynamically (at runtime) "hatch" new patterns, which severely limited their adaptability and hence applicability.

SUMMARY

An apparatus for migration and conversion of software code from any source platform to any target platform that migrates and/or converts any source application working on any platform into a format of any target platform. The apparatus comprises an inputting means for accepting the entire source code of sample part in ASCII to analyze the business logic of the source application, obtaining UI (User Interface)/GUI (Graphical User Interface) details of the source and target application. The inputting means also receives validation schemes of source front-end interface. It also obtains the definitions of the target back-end system, the existing test scripts to facilitate the quality control phase of the generated code, the source code entry points to business processes, target environment specification or definitions which includes target platform(s), languages to be used, target database, coding standards, target architecture and framework, third party components, existing applications which have to be plugged with target application, and sample code for the application working in the target environment (if available).

The apparatus also includes an analyzing means analyzes the source schemes provided by the client to create target schemes. It also analyzes the business logic in the source application to create workflow diagrams that represent the source application processes. In addition, it identifies the code segments in the source application and analyzes the target to generate the target architecture and the technology associated with it.

Further, the apparatus includes a setting up means for generating a custom knowledge base where the existing knowledge base is reviewed for particular migration. In cases in which no such knowledge base exists, a custom knowledge base is created.

In addition, the apparatus includes a processing means for conversion of source code in a format of a target specification, wherein the complete source code is passed through a knowledge engine (KE) on the basis of iteration. During this time the knowledge engine remains coupled to the knowledge base for conversion of source code in format of target specifications; and after each iteration the knowledge base is updated which leads to speedy and better conversion of source code as the Custom KB has now more structured information of source platform and source application with respect to target platform and target specifications.

The apparatus also includes a documenting means for generation of reports during a review of the process stage and a summary report after the end of the conversion process. The reports also include the code that is not converted automatically. This unconverted code is then converted manually at an applicant's resource center.

Also disclosed is an apparatus for migration and conversion of software code from any source platform to any target platform that migrates and/or converts any source application working on any platform into a format of any target platform comprises of: An inputting means for accepting the entire source code of sample part in ASCII to analyze the business logic of the source application, obtaining UI (User Interface)/GUI (Graphical User Interface) details of the source and target application, also receiving validation schemes of source front-end interface, obtaining the definitions of the target back-end system, the existing test scripts to facilitate the quality control phase of the generated code, the source code entry points to business processes, target environment specification or definitions which includes target platform(s), languages to be used, target database, coding standards, target architecture and framework, third party components, existing applications which have to be plugged with target application, and sample code for the application working in the target environment (if available); An analyzing means for analyzing the source schemes provided by the client to create target schemes, analyzing the business logic in the source application to create workflow diagrams that represent the source application processes, identifying the code segments in the source application and analyzing the target to generate the target architecture and the technology associated with it; A setting up means for generating custom knowledge base where the existing KB is reviewed for particular migration and in case of no such KB exist, a custom KB is created; A processing means for conversion of source code in format of target specification wherein the complete source code is passed through a knowledge engine on the basis of iteration and during this time the knowledge engine remains coupled to the knowledge base for conversion of source code in format of target specifications; and after each iteration the knowledge base is updated which leads to speedy and better conversion of source code as the Custom KB has now more structured information of source platform and source application with respect to target platform and target specifications; and A documenting means for generation of reports during review of the process stage and a summary report after the end of the conversion process, which consists of the code that is not converted automatically. This unconverted code is then converted manually at applicants Resource Center.

The present invention beneficially includes an apparatus for conversion and/or migration of any source application with no limitation of platforms on which the source or target systems are working. Some embodiments advantageously allow for this by providing a unique methodology to achieve the conversion or migration activities and providing an ability to "learn" and "infer" to efficiently perform the conversion task. Some disclosed embodiments use a knowledgebase concept, such that conversion process time decreases as more source applications are processed by the applicant's software tool. In addition, the embodiments convert and migrate using "intelligent" mechanism that utilizes neural networks and fuzzy rules. In summary it creates value by offering a unique ability to transform and convert any source to any target by using intelligent algorithms and fuzzy rules that have capability of learning to perform optimal conversion.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

System Configuration

Figure 1:
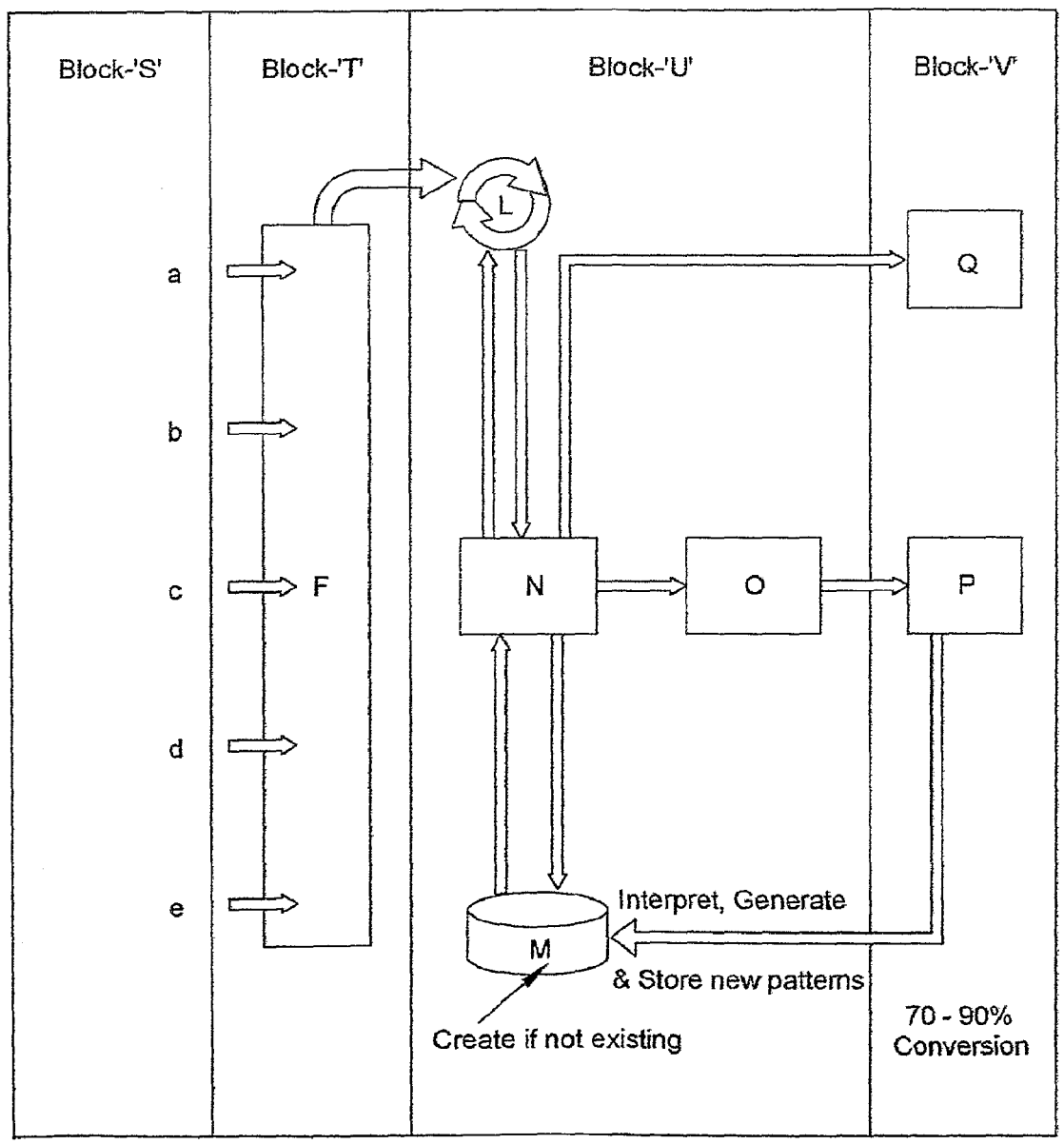
FIG. 1 illustrates a block diagram of one embodiment of the system in accordance with the present invention.

Referring first to FIG. 1, it illustrates a block diagram of one embodiment of the system in accordance with the present invention. According to one embodiment of the present invention, an apparatus for migration and conversion of software code from any source platform to any target platform migrates and/or converts any source application working on any platform into a format that any target platform.

The apparatus includes an inputting means for accepting the entire source code in ASCII format to analyze the business logic of the source application. Also included is a user interface (UI)/graphical user interface (GUI) that provides details of the source and target application. Also provided are validation schemes of a source front-end interface and definitions of the target back-end system. Existing test scripts facilitate the quality control phase of the generated code. The source code entry points to business processes and target environment specification or definitions, which include target platform(s), languages to be used, target database, coding standards, target architecture and framework, third party components, and details of existing applications that have to be plugged into the target application and sample code of the application working in target environment (if available).

The apparatus also includes an analyzing means for analyzing the source schemes provided by client to create target schemas. The means further includes analyzing the workflow diagrams that represent the source application process, identifying the code segments in source application and analyzing the target requirements that will generate the target architecture and the technology associated with it.

In addition, the apparatus includes a setting up means for generating custom knowledge base where the existing knowledge base (KB) is reviewed for particular migration. In instances where no such knowledge base exists, a custom knowledge base is created. The knowledge base also may be referenced as a custom knowledge base.

Further, the apparatus includes a processing means for conversion of source code into format of target specification. In particular, complete source code is passed through a knowledge engine (KE) on the basis of multiple iterations. During this time the knowledge engine remains coupled to the knowledge base for conversion of source code into format of target specification. After each iteration the knowledge base is updated which results in speedy and better conversion of source code as the knowledge base gets more structured with respect to source platform, source application, target platform and target application.

In addition, the apparatus includes a documenting means for generation of reports related to process stage and end of conversion process. The generated reports also include code that is not converted automatically, the reasons for the non-conversion and suggestions on how the unconverted code can be converted manually, for example, through an applicant resource center.

Figure 2:
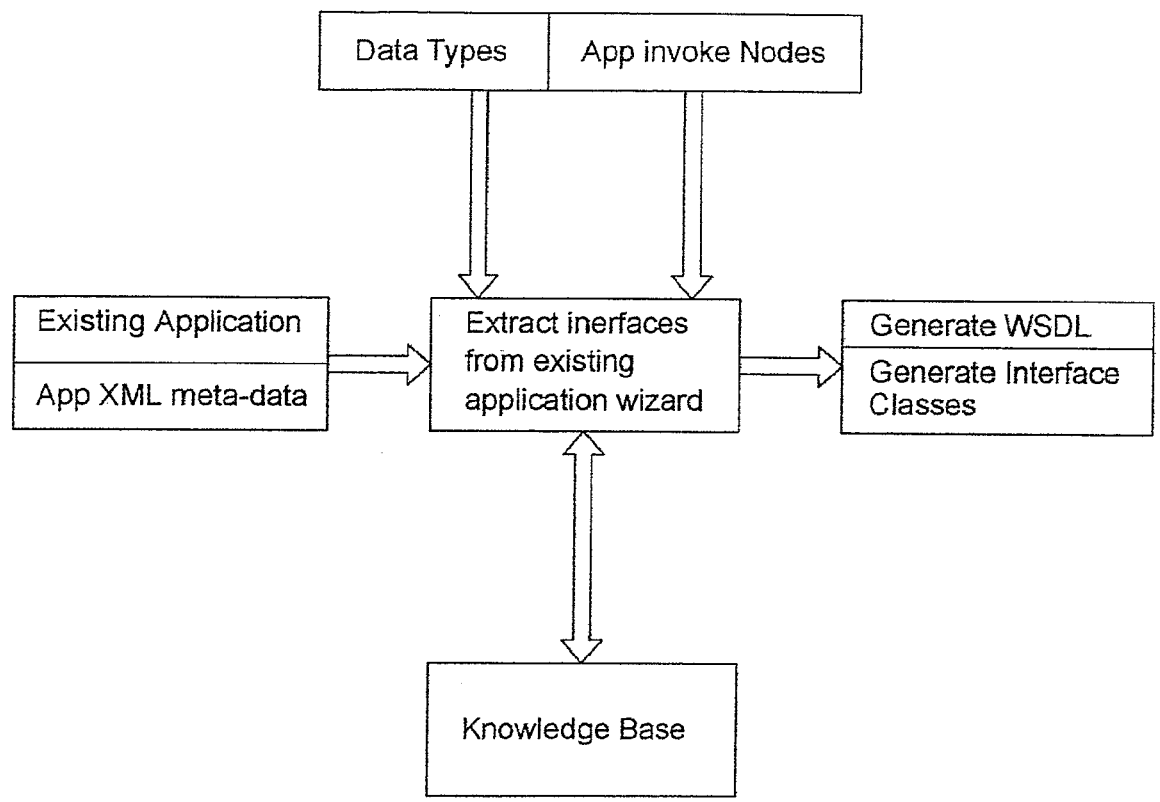
FIG. 2 illustrates an aided process for migration or enhancement of a software application.

Referring now to FIG. 2, it illustrates an aided process for migration or enhancement of a software application. In one embodiment, the apparatus and corresponding system is divided into two parts. The first is a knowledge base (KB) and the second is a knowledge engine (KE). One embodiment of a knowledge base is shown as block M in FIG. 1. This embodiment of the knowledge base includes a relational database that is comprised of source and target code patterns and attributes. The knowledge base (element M) resembles and consolidates the source and target language syntax, control structure and programming style. The structure of the custom knowledge base (element M) is decided on the basis of format of source and target application. After each iteration the custom knowledge base (element M) is updated by the knowledge engine. This configuration helps increase the rate of automatic conversion.

The knowledge base can be accessed by standard object data base connectivity (ODBC) connection or through disk input/output (I/O) operations. The knowledge base may also involve an interface layer that will allow the knowledge engine to connect to it remotely. It is noted that element M also may be referenced as block M. However, the reference to element M helps eliminate confusion with respect to references to Blocks S, T, U, and V described in FIG. 2.

One embodiment of a knowledge engine is illustrated as block N in FIG. 1. The knowledge engine is a processing unit that allows the input code to be intercepted, interpreted and converted into target output code. The knowledge engine automates code migration and enhancements, allowing for many different design and development options.

To extract the business logic from the source application, the knowledge engine performs functions as described herein. In particular, the knowledge engine intercepts the input code based on defined syntax in the custom knowledge base (element M). In addition, it interprets the source code using fuzzy logic routines. Further, the knowledge engine parses input code, segregates code blocks, and converts them into intermediate or target specific format using the knowledge base (element M). The knowledge engine also marks the unconverted or ignored blocks and sentences of the source code and stores them in the knowledge base (element M) for future use.

In case of migration of a data driven system, one embodiment of the knowledge engine operates a process as noted herein. The process interprets database schemes and data file formats and generates generate a knowledge base (block M) segment. This creates data dictionary definitions. The process interprets source code, parses it and converts it into target specific code with the help of the generated data dictionary definitions. The process marks the unconverted or ignored blocks and sentences of the source code and stores them in the knowledge base (element M) for future use. The process is repeated for arriving at the final code thereby involving intermediate processes.

Turning now to Block S in FIG. 2, inputs a, b, c, d and e represent the input code components. These components are input files that are divided based on program logic code (PLC), user interface (UI), data dictionary, validation, associated program logic (APL) files or data definition files. In one embodiment, a user performs this task. Referring next to Block T, element F is a code validation stage. In this stage, the knowledge element determines if all the required input files are available for processing.

At the next stage, Block U, element N is the Knowledge Engine (KE) component of the system. This component is the primary processing module that processes the input code. Also in Block U is previously described element M, the knowledge base. As noted, the knowledge base is configured to store patterns and discovered data within the system. The symbol L in Block U represents the "iterative process" by which input code is iteratively processed by knowledge engine. The element O references a logical extension of the knowledge engine. It is configured to package the output code generated by knowledge engine.

In the next stage, Block V, element Q represents the target code generated by the tool as well as the summary report documenting the entire conversion process. Element P in Block V represents the ignored or unconverted source code. The ignored code is fed back into the knowledge base (element M) after verification to determine new patterns, which the user will insert into the knowledge base (element M) through the knowledge base configuration process.

System Operation

Reference is now made to an embodiment of the workings of the system (system operation) with the help of drawings. When any source application is required to be converted and/or migrated to a target specific format then an embodiment of a process is as described herein. The first stage, referenced as an input stage or Block S in FIG. 2, comprises a migration or conversion process. This stage includes receiving the source application to analyze it systematically and logically. It also includes defining the architecture of the target application. As described herein, from this stage, either an existing library is refined or a new library knowledge base (element M) is created to fulfil the requirements of the source and target application as closely as possible.

In the input stage, a number of inputs may be received. For example, an entire source code of a sample part in ASCII (American Standard Code for Information Interchange), shown as 'a' is received so it can be analyzed to understand the business logic of the source application. From this information, the knowledge base (element M) can be defined, that is, created or updated. Reference to 'b' in this stage corresponds to receipt of user interface (UI)/graphical user interface (GUI) details of the source application. It also refers to defining the UI details of the target application. In one embodiment, for an effective conversion, validation schemes of source front-end interface are also received into this stage.

Continuing with the initial stage (Block S), the process obtains definitions of the target system database, which are referenced as 'c' in the figure. For a relational target database the scheme formats may be in structured query language (SQL) or, for mainframe computers, in fragments of the flat file database with copybook structure in ASCII format.

Next, if test scripts already exist, referenced as 'd' in the figure, these are received and used to facilitate the quality control phase of the generated target code. Reference 'e' corresponds to determining whether the source code entry points to business processes. In some embodiments, details provided by the UI may be sufficient to decide the entry points. If not, the user is asked to specify the entry points.

It is noted that the target environment specification or definitions are defined. These include target platform(s), languages to be used, target database, coding standards, target architecture and framework, third-party components, existing applications which have to be plugged with target application, and sample code for the application working in target environment (if available).

The second stage is the analysis stage, which is shown as block T in FIG. 2. In the analysis stage, source code is analysed for conversion. In particular, a database analysis is undertaken in which the source schemas provided by a client are analyzed to create target schemas. A business analysis then is undertaken in which workflow diagrams that represent the source application processes are obtained. This analysis is used in generating the knowledge base (element M). The last process of this stage is a target analysis that generates the target architecture and the technology associated with it. The target architecture and the technology associated with it are added to the target application segment of the knowledge base (element M).

The third stage is a 'setup stage', which is illustrated as block U in FIG. 2. In the setup stage, a generation of a custom knowledge base (element M) takes place. In particular, initially the existing knowledge base (element M) is reviewed for a particular migration. In a case of no such knowledge base (element M) exists, a custom knowledge base (element M) is created as follows herein. The selected parts of a sample code 'a', user interface 'b', and a database (back-end schemes) 'c' are introduced to the knowledge engine (element N). The formulation done by knowledge engine (element N) on 'a', 'b' and 'c' form the base for the target requirements in the custom knowledge base (element M).

Through an iterative process, illustrated as 'L' in FIG. 2, the selected source code fragment is passed multiple times through to the knowledge engine (element N). This process collects knowledge patterns. The process continues until the knowledge engine (element N) gets the signal for saturation from the knowledge base (element M). It is noted that test scripts provided by the client also are passed through the knowledge engine (element N). Alternatively, test scripts are created by the knowledge engine (element N) itself.

The next stage is the 'process stage', shown as block U in FIG. 2. In this stage, the complete source code is passed through the knowledge engine (element N) on a basis of iteration. During this time the knowledge engine (element N) is coupled to the custom knowledge base (element M) for conversion of source code in the format of target specifications. After each iteration, the knowledge base (element M) is updated. This leads to a speedy and better conversion of source code as the knowledge base (element M) has now more structured information of source platform and source application with respect to target platform and target application.

The last stage is the documentation stage, illustrated as block V in FIG. 2. Reports generated during the process stage are reviewed in this stage. After a conversion process, a summary report shown as P is generated. The summary report consists of code that may not have automatically converted (element O). This unconverted code is then manually converted at an applicant's resource center. However, by this stage the applicant may have achieved 70 to 90% automatic conversion.

In this last stage two other processes are also performed. First process is a target database verification. This process includes verifying the converted database and the data dictionary with respect to the source scheme. The second process is a target application verification. This process includes verifying the converted application and its program links with respect to the source code process flow during the analysis stage (block S).

It is noted that in one or more embodiments, attributes may be formed by extracting keywords and language dependent descriptions from input supplied. The attributes may include code comments, functions, procedures, routine definition strings, parameter name strings, and main control blocks in the code for structures (e.g., if-else, do-while, while). The attributes also comprise database schemas, data file definitions and formats, and data entity definitions (including variable names, data types and size).

Also, it is noted that in one or more embodiments, business logic may be business rules for the application embedded in the input data stream. In addition, it is noted that in one or more embodiments, pattern matching may be a process by which a pattern is derived to represent a data stream to facilitate decoding information from the data stream.

In general, embodiments of the present invention described herein allow transformation of an input data stream by utilizing matching patterns and performing pattern based conversion. Further, one or more embodiments provide an ability to arrive at new patterns dynamically in case a matching pattern is not found or is not pre-defined in the knowledge base (or knowledgebase or KB) when performing the transformation.

In one or more embodiments, the knowledge engine may use dynamic fuzzy mechanisms and rules to perform discovery, extraction, and transformation of the input data stream. In general, the knowledge engine performs the knowledge gathering process. Further, those skilled in the art will note that because the knowledge engine may use fuzzy mechanisms and rules, the knowledge engine may be "trained" to gather knowledge seamlessly across various systems and data formats.

Some portions of this description describe embodiments in terms of algorithms and symbolic representations of operations on information, for example, the processes described and illustrated with respect to FIG. 1. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. As is well known to those skilled in the art, such computer programs may be stored in a non-transitory, tangible computer readable storage medium.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an apparatus for migration and conversion of software code from any source platform to any target platform through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

We claim:

1. A method, executable by at least one processor, for converting software code of a source application on a source platform into software code of a target application on a target platform, the method comprising:

accepting the source code of the source application to analyze business logic of the source application;

obtaining User Interface (UI) details of the source application;

receiving a validation scheme of a source front-end interface;

obtaining (1) a definition of a target back-end system, (2) existing test scripts to facilitate quality control of generated software code for the target application, (3) source code entry points to business processes, (4) target environment specification including the target platform, languages to be used, target database, coding standards, target architecture and framework, (5) third party components, (6) existing applications to be plugged with the target application, and (7) sample code for the target application;

analyzing provided source schemes to create target schemes;

analyzing the business logic of the source application to create workflow diagrams that represent processes of the source application;

identifying code segments of the source application;

analyzing the target environment to generate a target architecture and associated technology;

responsive to no existing knowledge base for the software code conversion existing, generating a custom knowledge base for the software code conversion, wherein the custom knowledge base comprises a relational database comprising source and target code patterns and attributes and residing on a non-transitory computer-readable storage medium;

converting the source code into a format of the target environment specification using fuzzy rules, wherein the source code is passed through a knowledge engine for a plurality of iterations, the knowledge engine remains coupled to the custom knowledge base during the plurality of iterations for conversion of the source code into the format of the target environment specification, the custom knowledge base is updated to include additional structured information of the source platform and the source application with respect to the target platform and the target environment specification after each iteration to cause the knowledge engine to enhance source code conversion in subsequent iterations; and generating a report comprising a portion of the source code of the source application that is not converted automatically for manual conversion.

2. The method of claim 1, further comprising:
dynamically hatch new patterns to be used to convert the source code into the format of the target environment specification.

3. The method of claim 1, wherein converting the source code into a format of the target environment specification comprises:
utilizing neural networks to convert the source code into the format of the target environment specification.

4. The method of claim 1, wherein an existing knowledge base is provided for understanding the source application, the source platform, the target environment specification, and the target platform.

5. The method of claim 1, further comprising:
extracting the business logic and database schema of the source application systematically and logically; and
converting the extracted business logic and database schema of the source application into a format specified for the target application.

6. A non-transitory computer-readable storage medium encoded with executable computer program code for converting software code of a source application on a source platform into software code of a target application on a target platform, the computer program code comprising program code for:

accepting the source code of the source application to analyze business logic of the source application;

obtaining User Interface (UI) details of the source application;

receiving a validation scheme of a source front-end interface;

obtaining (1) a definition of a target back-end system, (2) existing test scripts to facilitate quality control of generated software code for the target application, (3) source code entry points to business processes, (4) target environment specification including the target platform, languages to be used, target database, coding standards, target architecture and framework, (5) third party components, (6) existing applications to be plugged with the target application, and (7) sample code for the target application;

analyzing provided source schemes to create target schemes;

analyzing the business logic of the source application to create workflow diagrams that represent processes of the source application;

identifying code segments of the source application;

analyzing the target environment to generate a target architecture and associated technology;

responsive to no existing knowledge base for the software code conversion existing, generating a custom knowledge base for the software code conversion, wherein the custom knowledge base comprises a relational database comprising source and target code patterns and attributes and residing on a non-transitory computer-readable storage medium;

converting the source code into a format of the target environment specification using fuzzy rules, wherein the source code is passed through a knowledge engine for a plurality of iterations, the knowledge engine remains coupled to the custom knowledge base during the plurality of iterations for conversion of the source code into the format of the target environment specification, the custom knowledge base is updated to include additional structured information of the source platform and the source application with respect to the target platform and the target environment specification after each iteration to cause the knowledge engine to enhance source code conversion in subsequent iterations; and generating a report comprising a portion of the source code of the source application that is not converted automatically for manual conversion.

7. The non-transitory computer-readable storage medium of claim 6, wherein the computer program code further comprising program code for:
dynamically hatch new patterns to be used to convert the source code into the format of the target environment specification.

8. The non-transitory computer-readable storage medium of claim 6, wherein converting the source code into a format of the target environment specification comprises:
utilizing neural networks to convert the source code into the format of the target environment specification.

9. The non-transitory computer-readable storage medium of claim 6, wherein an existing knowledge base is provided for understanding the source application, the source platform, the target environment specification, and the target platform.

10. The non-transitory computer-readable storage medium of claim 6, wherein the computer program code further comprising program code for:
extracting the business logic and database schema of the source application systematically and logically; and
converting the extracted business logic and database schema of the source application into a format specified for the target application.

11. An apparatus, having at least one processor, for converting software code of a source application on a source platform into software code of a target application on a target platform, the apparatus comprising:
an inputting means for accepting the source code of the source application to analyze business logic of the source application, obtaining User Interface (UI) details of the source application, receiving a validation scheme of a source front-end interface, obtaining (1) a definitions of a target back-end system, (2) existing test scripts to facilitate quality control of generated software code for the target application, (3) source code entry points to business processes, (4) target environment specification including the target platform, languages to be used, target database, coding standards, target architecture and framework, (5) third party components, (6) existing applications to be plugged with the target application, and (7) sample code for the target application;
an analyzing means for analyzing provided source schemes to create target schemes, analyzing the business logic of the source application to create workflow diagrams that represent processes of the source application, identifying code segments of the source application, and analyzing the target environment to generate a target architecture and associated technology;
a setting up means for generating a custom knowledge base for the software code conversion that is responsive to no existing knowledge base for particular migration existing, wherein the custom knowledge base comprises a relational database comprising source and target code patterns and attributes and residing on a non-transitory computer-readable storage medium;
a processing means for conversion of source code into a format of the target environment specification, using fuzzy rules, wherein the source code is passed through a knowledge engine for a plurality of iterations, the knowledge engine remains coupled to the custom knowledge base during the plurality of iterations for conversion of the source code into the format of the target environment specification, the knowledge base is updated to include additional structured information of the source platform and the source application with respect to the target platform and the target environment specification after each iteration to cause the knowledge engine to enhance source code conversion in subsequent iterations; and
a documenting means for generation of a report comprising a portion of the source code of the source application that is not converted automatically for manual conversion.

12. The apparatus in claim 11 wherein an existing knowledge base is provided for understanding the source application, the source platform, the target environment specification, and the target platform.

13. The apparatus in claim 11, wherein the processing means is further configured to extract the business logic and database schema of the source application systematically and logically and to convert them into a format specified for the target application.

14. The apparatus in claim 11, wherein the processing means is further configured to dynamically hatch new patterns to be used to convert the source code into the format of the target environment specification.

15. The apparatus in claim 11, wherein the processing means is further configured to utilize neural networks to convert the source code into the format of the target environment specification.

* * * * *